US012670737B2

(12) United States Patent
Zhao et al.

(10) Patent No.: US 12,670,737 B2
(45) Date of Patent: Jun. 30, 2026

(54) DYNAMIC DOCUMENT CLASSIFICATION

(71) Applicant: International Business Machines Corporation, Armonk, NY (US)

(72) Inventors: Jun Hong Zhao, ShangDi (CN); Dong Rui Li, Beijing (CN); Ang Yi, Beijing (CN); Jing Zhang, Beijing (CN); Hai Cheng Wang, Beijing (CN); Yang Zhong Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 18/493,027

(22) Filed: Oct. 24, 2023

(65) Prior Publication Data

US 2025/0131759 A1 Apr. 24, 2025

(51) Int. Cl.

| | |
|---|---|
| ***G06V 30/413*** | (2022.01) |
| ***G06V 30/14*** | (2022.01) |
| ***G06V 30/18*** | (2022.01) |
| ***G06V 30/19*** | (2022.01) |

(52) U.S. Cl.

CPC ........ *G06V 30/413* (2022.01); *G06V 30/1444* (2022.01); *G06V 30/18* (2022.01); *G06V 30/19147* (2022.01); *G06V 30/1916* (2022.01); *G06V 30/19173* (2022.01); *G06V 30/1918* (2022.01); *G06V 2201/10* (2022.01)

(58) Field of Classification Search

CPC ..................... G06V 2201/01; G06V 30/00–43

See application file for complete search history.

(56) References Cited

U.S. PATENT DOCUMENTS 10,846,573 B2 11/2020 Skinner
11,501,061 B2 11/2022 Foncubierta Rodriguez (Continued)

OTHER PUBLICATIONS

Disclosed Anonymously, "The automatic method for layout mapping and generation to help Optical Character Recognition", An IP.com Prior Art Database Technical Disclosure, IP.com No. IPCOM000256802D, IP.com Electronic Publication Date: Jan. 1, 2019, 6 pages, <https://priorart.ip.com/IPCOM/000256802>.

(Continued)

*Primary Examiner* — Sean T Motsinger
(74) *Attorney, Agent, or Firm* — Andre Adkins

(57) ABSTRACT

In an approach, a processor performs document layout analysis on a document generating a plurality of textual regions; extracts characteristics from each of the plurality of textual regions and associates the respective characteristics to the respective textual region as metadata; classifies each of the plurality of textual regions as an optical character recognition (OCR) region, non-OCR valuable region, or non-OCR non-valuable region using a classifier; performs OCR on each OCR region generating an OCR output; identifies associated constant OCR data from a constant OCR data repository for each non-OCR valuable region; merges the associated constant OCR data with the OCR output generating a complete OCR data for the received document; performs data extraction on the complete OCR data to identify data fields and key-value pairs generating extracted data; and determines whether the extracted data is valid based on a set of rules.

14 Claims, 4 Drawing Sheets

(56) References Cited

U.S. PATENT DOCUMENTS

| | | | | |
|---|---|---|---|---|
| 2015/0193900 | A1* | 7/2015 | Lau | G06V 20/62 382/100 |
| 2017/0083797 | A1 | 3/2017 | Kumar | |
| 2017/0147552 | A1* | 5/2017 | Carroll | G06V 10/44 |
| 2018/0032842 | A1 | 2/2018 | Yellapragada | |
| 2020/0160050 | A1* | 5/2020 | Bhotika | G06V 30/414 |
| 2021/0256253 | A1 | 8/2021 | Xingyao | |
| 2022/0164572 | A1 | 5/2022 | Yuan | |
| 2024/0062568 | A1* | 2/2024 | Khan | G06V 30/10 |
| 2024/0290123 | A1* | 8/2024 | Agrahari | G06V 30/16 |

OTHER PUBLICATIONS

No Author, "IBM Automation Document Processing" IBM Products, Jun. 4, 2023, 8 Pages.

* cited by examiner

100

COMPUTER 101

PROCESSOR SET 110

PROCESSING CIRCUITRY 120      CACHE 121

COMMUNICATION FABRIC 111

VOLATILE MEMORY 112

PERSISTENT STORAGE 113

OPERATING SYSTEM 122

DYNAMIC OCR CLASSIFICATION PROGRAM 126

PERIPHERAL DEVICE SET 114

UI DEVICE SET 123      STORAGE 124      IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

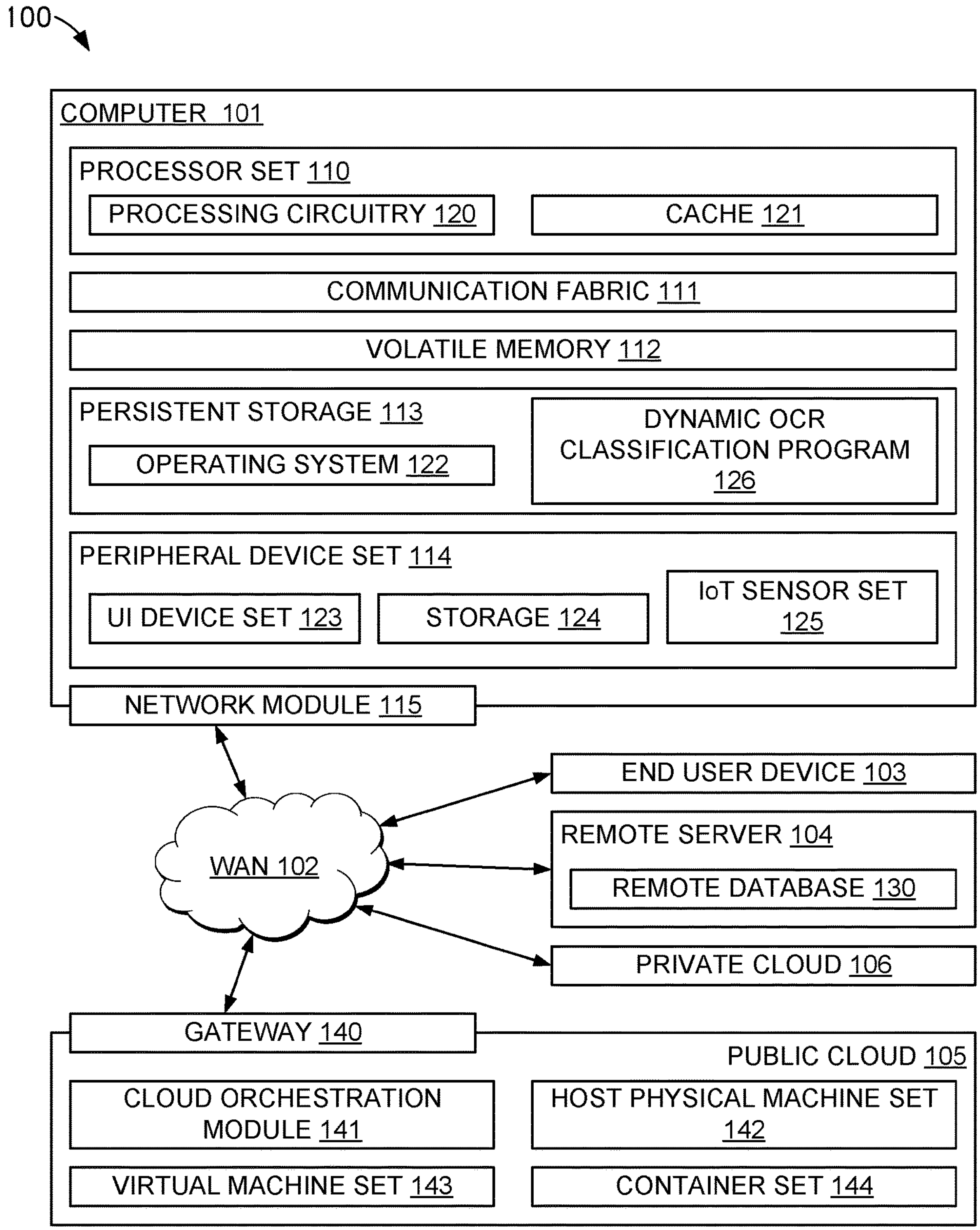

PERFORM DOCUMENT LAYOUT ANALYSIS ON RECEIVED DOCUMENT

310

EXTRACT CHARACTERISTICS FROM EACH TEXTUAL REGION

315

CLASSIFY EACH TEXTUAL REGION AS OCR REGION, NON-OCR VALUABLE REGION, OR NON-OCR NON-VALUABLE REGION USING TRAINED MODEL

320

PERFORM OCR ON TEXTUAL REGIONS CLASSIFIED AS OCR REGION AND RECEIVE OCR OUTPUT

325

FOR NON-OCR VALUABLE REGIONS, IDENTIFY ASSOCIATED CONSTANT OCR DATA FROM CONSTANT OCR DATA REPOSITORY

330

MERGE CONSTANT OCR DATA WITH OCR OUTPUT TO GENERATE COMPLETE OCR DATA FOR THE RECEIVED DOCUMENT

335

PERFORM DATA EXTRACTION ON COMPLETE OCR DATA

340

EXTRACTED DATA VALID?

NO

YES

345

SENDS VALIDATED EXTRACTED DATA TO DOWNSTREAM APPLICATIONS

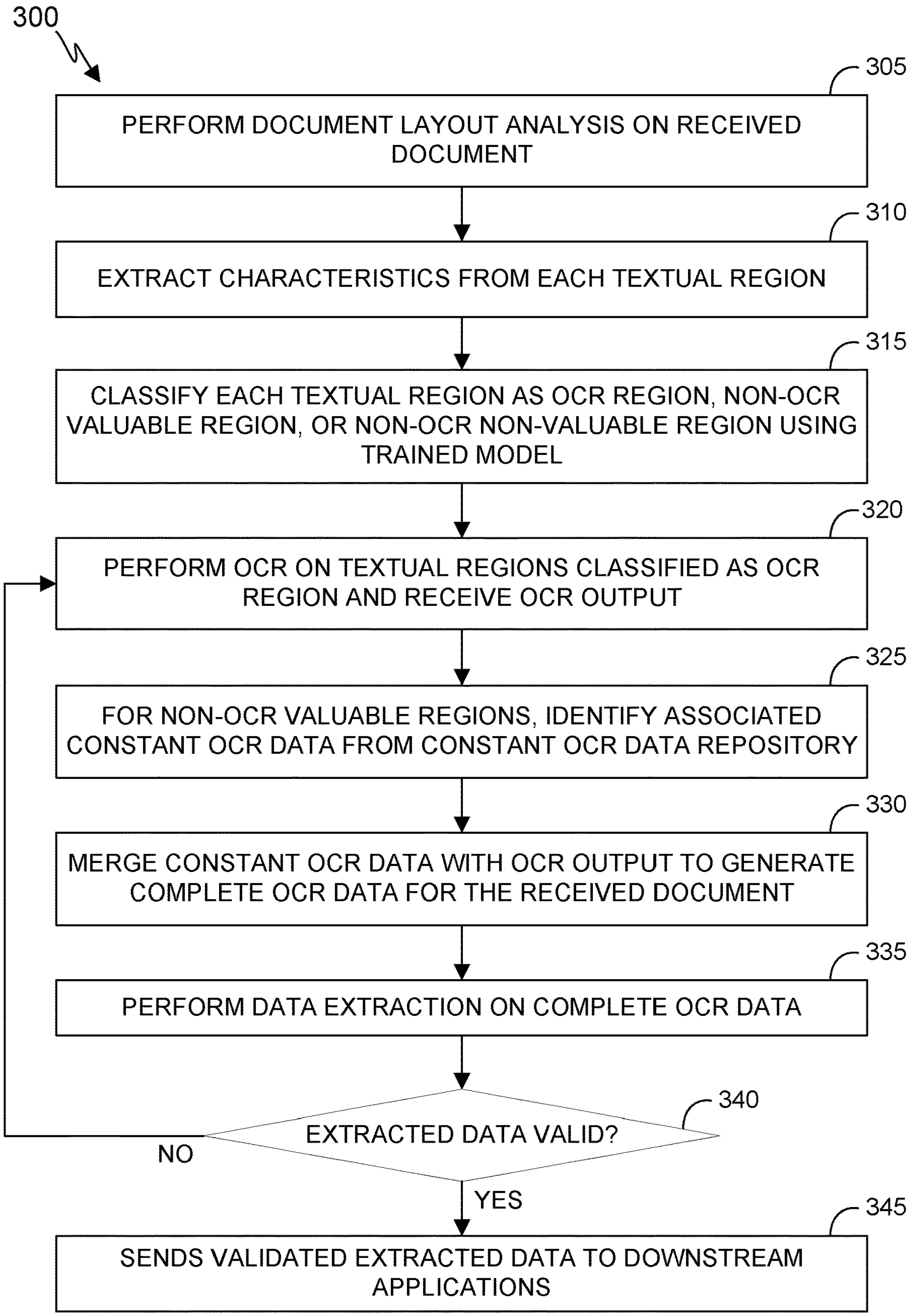

COLLECT AND STORE OCR OUTPUTS IN OCR RESULT REPOSITORY

410

COLLECT AND STORE DATA USAGE INFORMATION FROM DOWNSTREAM APPLICATIONS IN DATA USAGE REPOSITORY

415

DYNAMICALLY TRAIN AND UPDATE THE MODEL USING THE OCR OUTPUTS AND THE DATA USAGE INFORMATION

DYNAMIC DOCUMENT CLASSIFICATION

BACKGROUND OF THE INVENTION

The present invention relates generally to the field of data processing, and more particularly to a method and system for improving efficiency of document processing and quality of information retrieval.

Automated document processing plays a key role in modern organizations for a variety of reasons. It provides numerous benefits to businesses in terms of efficiency, accuracy, compliance, and cost savings. Automated document processing significantly speeds up routine tasks such as data entry, information extraction, sorting, and filing. This efficiency gain leads to faster decision-making, improved productivity, and reduced turnaround times, which is essential in today's fast-paced business environment. Manual data entry and processing can be prone to errors, which could lead to serious consequences in business operations.

Optical character recognition (OCR) is the electronic conversion of images of typed, handwritten, or printed text into machine-encoded text, whether from a scanned document, a photo of a document, a scene photo (e.g., the text on signs and billboards in a landscape photo) or from subtitle text superimposed on an image (e.g., from a television broadcast).

Widely used as a form of data entry from printed paper data records-whether passport documents, invoices, bank statements, computerized receipts, business cards, mail, printed data, or any suitable documentation—it is a common method of digitizing printed texts so that they can be electronically edited, searched, stored more compactly, displayed online, and used in machine processes such as cognitive computing, machine translation, (extracted) text-to-speech, key data, and text mining. OCR is a field of research in pattern recognition, artificial intelligence, and computer vision.

SUMMARY

Aspects of an embodiment of the present invention disclose a method, computer program product, and computer system for improving efficiency of document processing and quality of information retrieval. One or more processors, responsive to receiving a document, perform document layout analysis on the received document generating a plurality of textual regions. One or more processors extract characteristics from each of the plurality of textual regions and associating the respective characteristics to the respective textual region as metadata. One or more processors classify each of the plurality of textual regions as an optical character recognition (OCR) region, non-OCR valuable region, or non-OCR non-valuable region using a classifier. One or more processors perform OCR on textual regions classified as the OCR region generating an OCR output. One or more processors identify associated constant OCR data from a constant OCR data repository for the textual regions classified as the non-OCR valuable region. One or more processors merge the associated constant OCR data with the OCR output generating a complete OCR data for the received document. One or more processors perform data extraction on the complete OCR data to identify data fields and key-value pairs generating extracted data. One or more processors determine whether the extracted data is valid based on a set of rules.

These and other features and advantages of the present invention will be described in, or will become apparent to those of ordinary skill in the art in view of, the following detailed description of the example embodiments of the present invention.

BRIEF DESCRIPTION OF THE DRAWINGS

FIG. 1 is a functional block diagram illustrating a computing environment, for running a dynamic OCR classification program, in accordance with an embodiment of the present invention.

FIG. 3 is a flowchart depicting operational steps of the dynamic OCR classification program, for using a classifier dynamically trained on previously extracted data to classify each textual region of a document and performing data extraction on each textual region based on the classification, running on a computer of the distributed data processing environment of FIG. 1, in accordance with an embodiment of the present invention.

DETAILED DESCRIPTION

Figure 2:
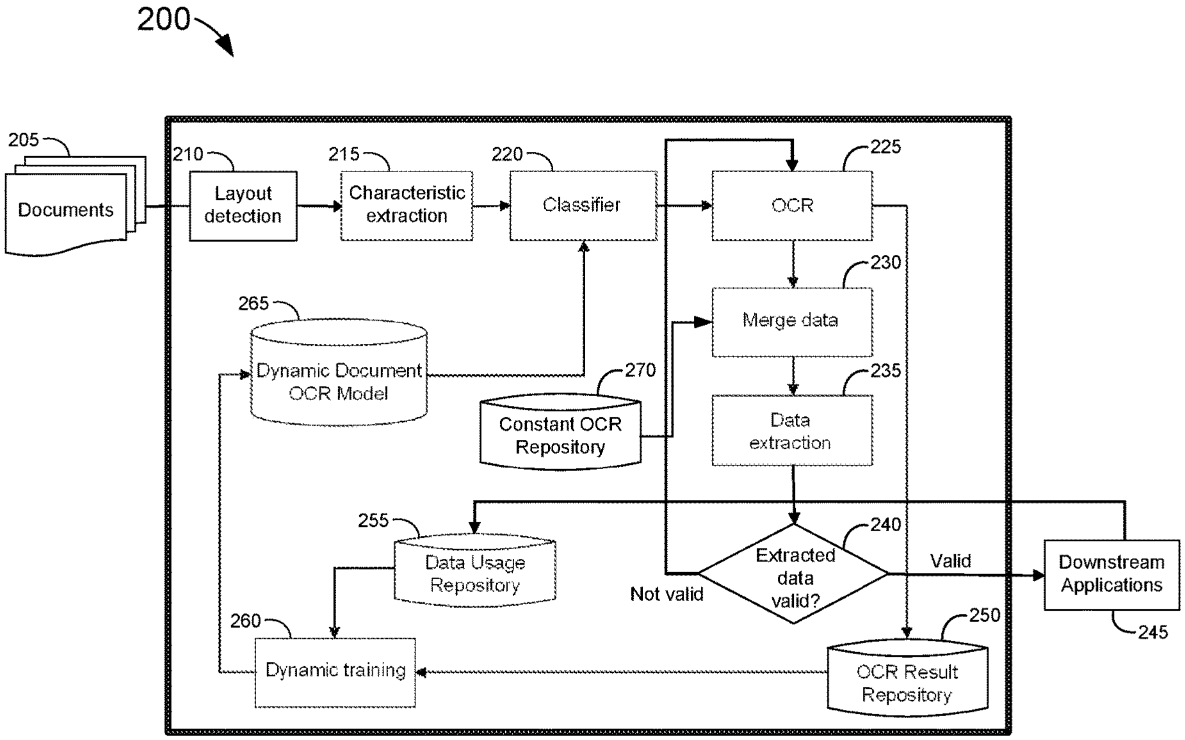
FIG. 2 depicts a block diagram process flow of a system running the dynamic OCR classification program in accordance with an embodiment of the present invention.

Embodiments of the present invention recognize that OCR is a fundamental part of automated document processing as the data extraction from a document depends on the OCR result. However, OCR is the most time consuming and resource sensitive part with its performance greatly impacting the productivity of the entire automated document processing process. The more textual content a document contains, the more time will be spent in the OCR phase of processing. But, in most cases, not all the textual content from a document is needed for data extraction. Also, for certain types of documents, a portion of the textual content is fixed for all documents of that type, e.g., invoices. Therefore, embodiments of the present invention recognize that OCR is unnecessary (and may be redundant) for certain portions/regions/sections of textual content of documents.

Embodiments of the present invention provide a system and method for improving efficiency of document processing and quality of information retrieval by using a classifier dynamically trained on previously extracted data to classify each textual region of a document and performing data extraction on each textual region based on the classification. Embodiments of the present invention utilize a classifier trained to classify textual regions of documents as one of three types of regions: (1) an OCR region that is subject to OCR phase of data extraction, (2) a non-OCR valuable region that will skip the OCR phase of data extraction because the content in the textual region is constant for this type of document, or (3) a non-OCR non-valuable section that will skip the OCR phase of data extraction because it does not contain valuable content for data extraction.

In some embodiments, the classifier is initially trained using historical data or documents with manually labelled textual regions, but once the classifier is in use, the classifier is continuously trained on OCR outputs and data usage information from downstream applications that are fed the extracted and validated data. In other embodiments, the classifier is not feed any training data initially, and thus will initially classify all textual regions as an OCR region. As more and more documents are processed, the classifier learns how to classify each textual region based on collected OCR output and usage information. For example, by monitoring OCR output and usage information, the classifier will find that some textual regions have the same OCR result and the OCR data is used in downstream application, so those textual regions should be classified as non-OCR valuable regions. This information is fed back to the classifier so that next time the classifier will classify this kind of textual region as a non-OCR valuable region. In this way, the classifier does not require any manual labeling.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Implementation of embodiments of the present invention may take a variety of forms, and exemplary implementation details are discussed subsequently with reference to the Figures.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In FIG. 1, computing environment 100 contains an example of an environment for the execution of at least some of the computer code involved in performing the inventive methods, such as dynamic OCR classification program 126. In addition to dynamic OCR classification program 126, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and dynamic OCR classification program 126), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processors set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 116 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 116 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 depicts a block diagram process flow of a system 200 running dynamic OCR classification program 126 and dynamic training function thereof, in accordance with an embodiment of the present invention. In the depicted embodiment, system 200 receives one or more documents 205 triggering dynamic OCR classification program 126 to perform layout detection 210 on the received documents to divide each document into smaller textual regions. The textual regions are processed through characteristic extraction 215 and extracted characteristics are associated to respective textual regions as metadata. The textual regions with associated metadata are then processed by classifier 220 for classifying each textual region as an OCR region, a non-OCR valuable region, or a non-OCR non-valuable region. The textual regions classified as OCR regions are processed using OCR 225 with outputs being stored in OCR results repository 250, which are used for the dynamic training 260 of dynamic document OCR model 265 used by classifier 220. The OCR output from OCR 225 is merged 230 with associated constant OCR data from constant OCR repository 270 to form complete OCR data that is processed using data extraction 235 to extract of data fields and key-value pairs. Based on a set of rules, the extracted data is determined 240 to be valid or not, with validated data proceeding to downstream applications 245 for use. If the extracted data is determined 240 to be not valid based on the set of rules, then some textual regions originally classified as non-OCR are run through OCR 225 to catch something that was missed. Data usage information is collected from the downstream applications 245 and stored in data usage repository 255 to be used in the dynamic training 260 of dynamic document OCR model 265 used by classifier 220. Additional details on these process flow steps are described with reference to FIG. 3 below.

FIG. 3 is a flowchart, generally designated 300, illustrating the operational steps for dynamic OCR classification program 126, running on computer 101 of computing environment 100 of FIG. 1, in accordance with an embodiment of the present invention. In an embodiment, dynamic OCR classification program 126 operates to use a classifier dynamically trained on previously extracted data to classify each textual region of a document and perform data extraction on each textual region based on the classification. It should be appreciated that the process depicted in FIG. 3 illustrates one possible iteration of the process flow, which may be repeated for each document received for data extraction.

In step 305, dynamic OCR classification program 126 performs document layout analysis on the received document. In an embodiment, responsive to receiving a document (i.e., document that has been scanned), dynamic OCR classification program 126 performs document layout analysis (i.e., layout detection) on the received document. In an embodiment, dynamic OCR classification program 126 performs document layout analysis to divide the received document into smaller textual regions (i.e., data regions), which involves identifying and categorizing regions of interest in a scanned image of a text document as known to a person of skill in the art.

In step 310, dynamic OCR classification program 126 extracts characteristics from each textual region. In an embodiment, dynamic OCR classification program 126 extracts characteristics, including, but not limited to, position, font, color, semantic properties, etc., from each textual region by (1) randomly selecting one or more sub-regions within a text region; (2) performing OCR on the one or more sub-regions; (3) and analyzing the OCR results with natural language processing (NLP) to extract the characteristics for each textual region. The extracted characteristics for each textual region will be used in the next step by the model to classify each region. In an embodiment, dynamic OCR classification program 126 associates the extracted characteristics with the respective textual region as metadata. In an embodiment, dynamic OCR classification program 126 extracts additional characteristics for each textual region including, but not limited to, an image hash (i.e., hash value calculated using an algorithm) and a layout context (i.e., a location of a region inside a document and other surrounding regions).

In step 315, dynamic OCR classification program 126 classifies each textual region as an OCR region, a non-OCR valuable region, or a non-OCR non-valuable region using a classifier. In an embodiment, dynamic OCR classification program 126 classifies, using a trained or untrained classifier, each textual region as an OCR region (i.e., a region that will go through OCR), a non-OCR valuable region (i.e., a region that contains valuable content for data extraction, but the content is constant (i.e., the same) across documents of a certain document type, so OCR is skipped), and a non-OCR non-valuable region (i.e., a region that does not contain valuable content for data extraction, so OCR is skipped). In an embodiment, dynamic OCR classification program 126 classifies each textual region using a classifier dynamically trained on OCR output stored in an OCR result repository and data usage information from downstream applications stored in a data usage repository from past iterations of the program. In an embodiment, dynamic OCR classification program 126 runs the textual regions of the received document through the classifier and receives an output that includes a classification for each textual region and a confidence value associated with the classification assigned to each textual region.

In step 320, dynamic OCR classification program 126 performs OCR on each textual region classified as an OCR region and receives document OCR data for each OCR region output by the OCR process. In an embodiment, dynamic OCR classification program 126 performs OCR on each textual region classified as an OCR region, leveraging an OCR engine as known to a person of skill in the art, to convert an image of text into a machine-readable text format. In an embodiment, dynamic OCR classification program 126 analyzes the OCR output to identify new constant content and regions that should be classified as non-OCR valuable regions and feeds the analyzed OCR output back to the classifier to dynamically re-train the classifier, as further described in FIG. 4 below.

In step 325, dynamic OCR classification program 126, for each textual region classified as a non-OCR valuable region, identifies associated constant OCR data for each relevant textual region from a constant OCR data repository. In an embodiment, dynamic OCR classification program 126 reads, from the constant OCR data repository, the associated constant OCR data for each textual region classified as a non-OCR valuable region. The data of the constant OCR data repository is populated by monitoring the OCR output for each OCR region from the previous step 320. When dynamic OCR classification program 126 identifies that some OCR regions have the same OCR output, dynamic OCR classification program 126 determines that these textual regions should be classified as non-OCR valuable regions, labels the respective textual regions as non-OCR valuable regions, and saves the OCR data and associated metadata for these respective textual regions into the constant OCR data repository. In an embodiment, dynamic OCR classification program 126 feeds the newly labelled textual regions as non-OCR valuable regions back to the classifier for re-training the classifier to properly classify these textual regions in future iterations, as further described in FIG. 4 below.

In step 330, dynamic OCR classification program 126 merges the identified constant OCR data for each non-OCR valuable region with the document OCR data for each OCR region to generate complete OCR data for the received document.

In step 335, dynamic OCR classification program 126 performs data extraction on complete OCR data. In an embodiment, dynamic OCR classification program 126 extracts key-value pair data from the complete OCR data. The complete OCR data is just raw textual data of the document that cannot be consumed directly by a downstream application, and thus data extraction is used to extract field data in the form of key-value pair data from the complete OCR data to enable use of the data by downstream applications. For example, for an invoice document, dynamic OCR classification program 126 performs data extraction to extract fields from the document like invoice date, invoice number, etc. Dynamic OCR classification program 126 can utilize any key-value pair extraction methods known to a person of skill in the art.

In decision 340, dynamic OCR classification program 126 determines whether extracted data is valid based on a set of rules. In an embodiment, dynamic OCR classification program 126 determines whether the extracted data is valid based on a set of rules including generic rules and business specific rules that can be pre-defined by a user or set to default rules based on document type. The set of rules are used to determine whether the extracted data (e.g., key-value pairs) are good enough (i.e., proper data is extracted) for the received document to be consumed by downstream applications. For example, all invoice documents must have an invoice number, so the user can define a rule that will check whether the invoice number is extracted. If dynamic OCR classification program 126 determines the extracted data is not valid because the invoice number was not extracted meaning that the textual region containing the invoice number was not classified as an OCR region or a non-OCR valuable region, then dynamic OCR classification program 126 will go back to step 230 to perform OCR on more of the textual regions classified as either non-OCR valuable or non-OCR non-valuable. The more textual regions with these classifications will be based on the confidence value provided from the classification, so textual regions with originally low confidence values as non-OCR regions can now be run through OCR on this additional iteration. In an embodiment, dynamic OCR classification program 126 can choose these additional textual regions to be run through OCR based on a threshold value for the originally given confidence values.

If dynamic OCR classification program 126 determines the extracted data is valid (decision 340, YES branch), then dynamic OCR classification program 126 proceeds to step 345 and sends the validated data to the downstream applications. If dynamic OCR classification program 126 determines the extracted data is not valid (decision 340, NO branch), then dynamic OCR classification program 126 proceeds back to step 320 and performs OCR on the textual regions that included non-valid extracted data. For example, a user is using a reimbursement application that requires extraction of certain key fields of an invoice document. To ensure that dynamic OCR classification program 126 extracts those certain key fields accurately, the user defines certain validation rules to validate that the certain key fields are extracted before the complete OCR data for the invoice document is sent to the reimbursement application for further processing. If the extracted data does not pass the set of rules because some required fields were not extracted, dynamic OCR classification program 126 returns to step 320 to perform OCR on the textual regions that include the required fields that were not extracted.

Figure 4:
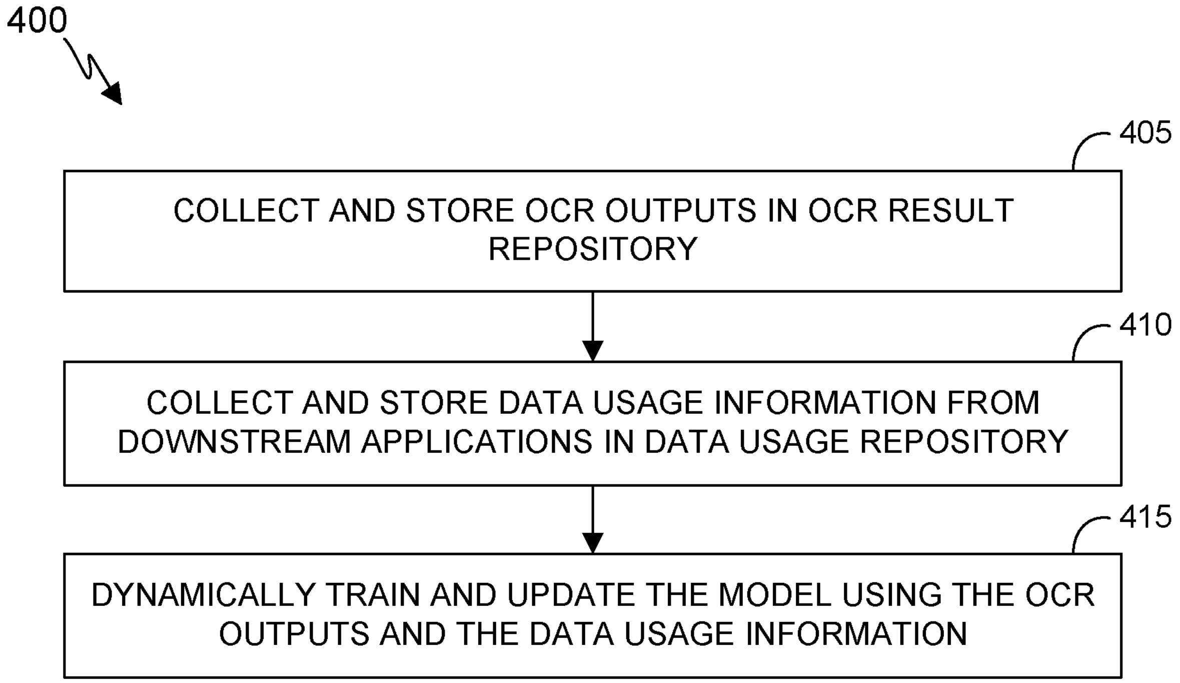
FIG. 4 is a flowchart depicting operational steps of a dynamic training function of the dynamic OCR classification program, for dynamically training a model to classify textual regions of a document based on previous OCR outputs and data usage information, running on a computer of the distributed data processing environment of FIG. 1, in accordance with an embodiment of the present invention.

FIG. 4 is a flowchart, generally designated 400, illustrating the operational steps of the dynamic training function of dynamic OCR classification program 126, running on computer 101 of computing environment 100 of FIG. 1, in accordance with an embodiment of the present invention. In an embodiment, the dynamic training function of dynamic OCR classification program 126 operates to dynamically train the model used to classify the textual regions using the data usage information and the document OCR data. It should be appreciated that the process depicted in FIG. 4 illustrates one possible iteration of the process flow.

In step 405, dynamic OCR classification program 126 monitors and collects the document OCR data output by the OCR process and stores the document OCR data in an OCR result repository. In an embodiment, dynamic OCR classification program 126 stores the OCR outputs in the repository within a list of textual regions, each of which contain the OCR text, region position (i.e., location) within a document, and other metadata (i.e., characteristics extracted).

In step 410, dynamic OCR classification program 126 monitors and collects data usage information from the downstream applications and stores the data usage information in a data usage repository. In an embodiment, dynamic OCR classification program 126 stores the data usage information (i.e., whether the extracted data was used by a downstream application) in the repository within a list of extracted data. The list of extracted data contains original extracted content and positions (i.e., location within a document), textual region information (i.e., characteristics extracted), corrected extracted content and positions (e.g., corrected by a user of a downstream application), whether extracted data was missed in data extraction (e.g., identified by a user of a downstream application), and whether extracted data was used in a downstream application.

In step 415, dynamic OCR classification program 126 dynamically trains and updates the model to classify the textual region of a document using the collected document OCR data (including characteristics extracted and associated as metadata) stored in the OCR result repository and the collected data usage information stored in the data usage repository.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:

responsive to receiving a document, performing, by one or more processors, document layout analysis on the received document generating a plurality of textual regions;

extracting, by the one or more processors, characteristics from each of the plurality of textual regions and associating the respective characteristics to the respective textual region as metadata;

classifying, by the one or more processors, each of the plurality of textual regions as an optical character recognition (OCR) region, non-OCR valuable region, or non-OCR non-valuable region using a classifier dynamically trained by an OCR model;

performing, by the one or more processors, OCR on textual regions classified as the OCR region generating an OCR output;

identifying, by the one or more processors, associated constant OCR data from a constant OCR data repository for the textual regions classified as the non-OCR valuable region;

merging, by the one or more processors, the associated constant OCR data with the OCR output generating a complete OCR data for the received document;

performing, by the one or more processors, data extraction on the complete OCR data to identify data fields and key-value pairs generating extracted data;

determining, by the one or more processors, whether the extracted data is valid based on a set of rules;

responsive to determining the extracted data is valid, sending, by the one or more processors, the extracted data to downstream applications; and collecting, by the one or more processors, data usage information associated with the extracted data sent to the downstream applications.

2. The computer-implemented method of claim 1, further comprising:

responsive to determining the extracted data is not valid, performing, by the one or more processors, OCR on respective textual regions that included non-valid extracted data.

3. The computer-implemented method of claim 1, wherein the characteristics extracted from each of the plurality of textual regions includes at least one of position, font, color, and semantic properties.

4. The computer-implemented method of claim 1, wherein extracting the characteristics from each of the plurality of textual regions comprises, for each textual region:

randomly selecting, by the one or more processors, one or more sub-regions within a textual region;

performing, by the one or more processors, OCR on the one or more sub-regions; and analyzing, by the one or more processors, an output of the OCR with natural language processing (NLP) to extract characteristics of the textual region.

5. The computer-implemented method of claim 1, wherein a respective OCR region is a textual region that will go through OCR processing, a respective non-OCR valuable region will not go through OCR processing but does contain content needed for data extraction and the content is constant across documents of a certain document type, and a respective non-OCR non-valuable will not go through OCR processing and does not contain content needed for data extraction.

6. The computer-implemented method of claim 1, further comprising:

dynamically training, by the one or more processors, the OCR model via the classifier using the OCR output and the data usage information.

7. A computer program product comprising:

one or more computer readable storage media and program instructions stored on the one or more computer readable storage media, the program instructions comprising:

program instructions to, responsive to receiving a document, perform document layout analysis on the received document generating a plurality of textual regions;

program instructions to extract characteristics from each of the plurality of textual regions and associating the respective characteristics to the respective textual region as metadata;

program instructions to classify each of the plurality of textual regions as an optical character recognition (OCR) region, non-OCR valuable region, or non-OCR non-valuable region using a classifier dynamically trained by an OCR model;

program instructions to perform OCR on textual regions classified as the OCR region generating an OCR output;

program instructions to identify associated constant OCR data from a constant OCR data repository for the textual regions classified as the non-OCR valuable region;

program instructions to merge the associated constant OCR data with the OCR output generating a complete OCR data for the received document;

program instructions to perform data extraction on the complete OCR data to identify data fields and key-value pairs generating extracted data;

program instructions to determine whether the extracted data is valid based on a set of rules responsive to program instructions to determine the extracted data is valid, program instructions to send the extracted data to downstream applications; and program instructions to collect data usage information associated with the extracted data sent to the downstream applications.

8. The computer program product of claim 7, further comprising:

program instructions to, responsive to determining the extracted data is not valid, perform OCR on respective textual regions that included non-valid extracted data.

9. The computer program product of claim 7, wherein the characteristics extracted from each of the plurality of textual regions includes at least one of position, font, color, and semantic properties.

10. The computer program product of claim 7, wherein the program instructions to extract the characteristics from each of the plurality of textual regions comprise, for each textual region:

program instructions to randomly select one or more sub-regions within a textual region;

program instructions to perform OCR on the one or more sub-regions; and program instructions to analyze an output of the OCR with natural language processing (NLP) to extract characteristics of the textual region.

11. The computer program product of claim 7, wherein a respective OCR region is a textual region that will go through OCR processing, a respective non-OCR valuable region will not go through OCR processing but does contain content needed for data extraction and the content is constant across documents of a certain document type, and a respective non-OCR non-valuable will not go through OCR processing and does not contain content needed for data extraction.

12. The computer program product of claim 7, further comprising:

program instructions to dynamically train the OCR model via the classifier using the OCR output and the data usage information.

13. A computer system comprising:

one or more computer processors;

one or more computer readable storage media;

program instructions collectively stored on the one or more computer readable storage media for execution by at least one of the one or more computer processors, the stored program instructions comprising:

program instructions to, responsive to receiving a document, perform document layout analysis on the received document generating a plurality of textual regions;

program instructions to extract characteristics from each of the plurality of textual regions and associating the respective characteristics to the respective textual region as metadata;

program instructions to classify each of the plurality of textual regions as an optical character recognition (OCR) region, non-OCR valuable region, or non-OCR non-valuable region using a classifier dynamically trained by an OCR model;

program instructions to perform OCR on textual regions classified as the OCR region generating an OCR output;

program instructions to identify associated constant OCR data from a constant OCR data repository for the textual regions classified as the non-OCR valuable region;

program instructions to merge the associated constant OCR data with the OCR output generating a complete OCR data for the received document;

program instructions to perform data extraction on the complete OCR data to identify data fields and key-value pairs generating extracted data;

program instructions to determine whether the extracted data is valid based on a set of rules responsive to program instructions to determine the extracted data is valid, program instructions to send the extracted data to downstream applications; and program instructions to collect data usage information associated with the extracted data sent to the downstream applications.

14. The computer system of claim 13, further comprising: program instructions to dynamically train the OCR model via the classifier using the OCR output and the data usage information.

* * * * *